United States Patent Office 2,734,273
Patented Feb. 14, 1956

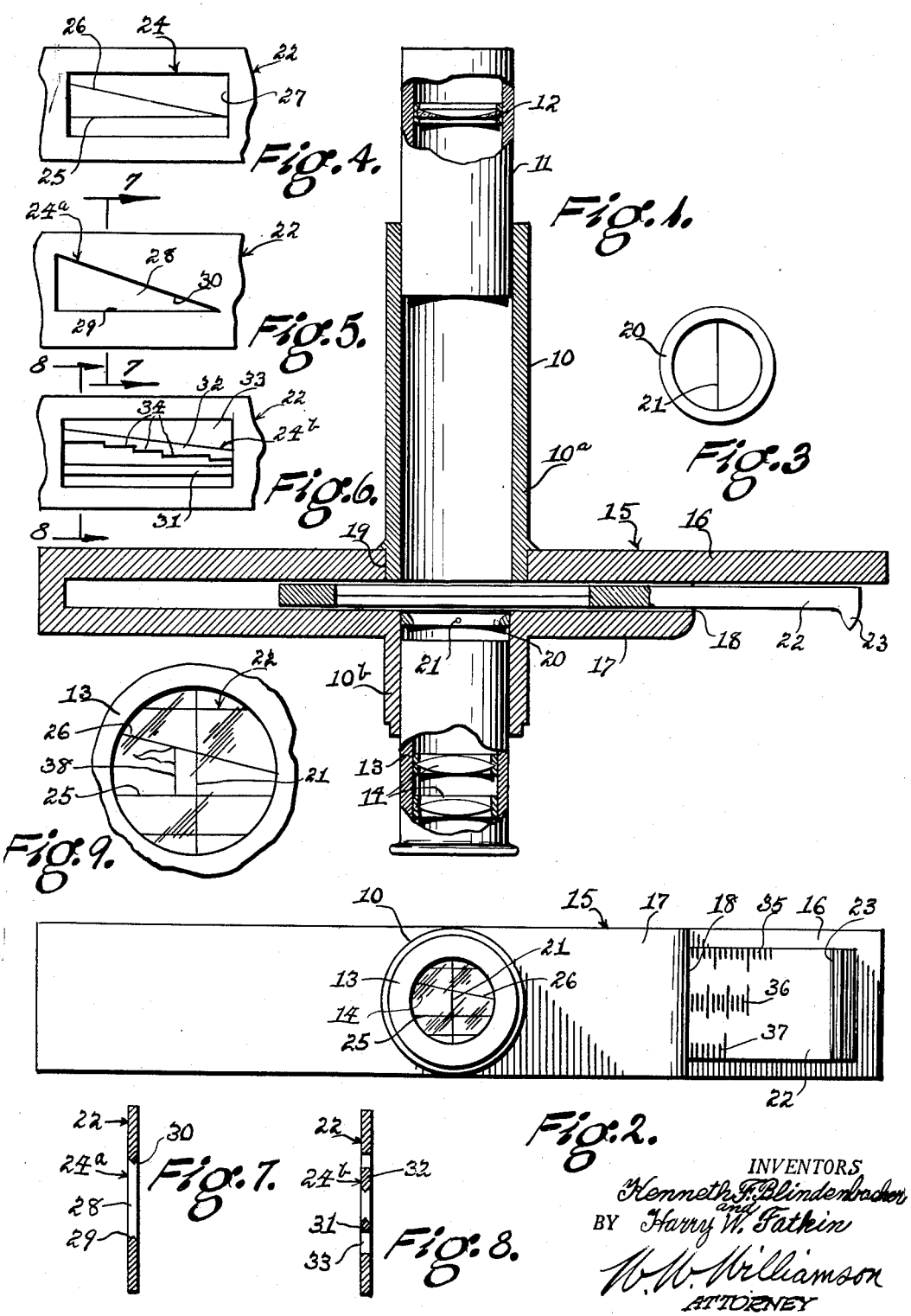

2,734,273

MEASUREMENT INDICATING MEANS FOR OPTICAL INSTRUMENTS

Kenneth F. Blindenbacher, Merchantville, and Harry W. Fatkin, Westville, N. J.

Application June 1, 1954, Serial No. 433,383

2 Claims. (Cl. 33—64)

Our invention relates to new and useful measurement indicating means for optical instruments to indicate the approximate or actual distance between a person employing the device and a sighted object, also the interval between two objects in spaced substantially horizontal relation, and the height and width of an object when the distance therefrom is known.

One of our primary aims has been to assist a golfer in making an approach to the pin or cup etc., on a green, especially from distances of approximately one hundred or two hundred yards out, by sighting the pin through a telescope equipped with the invention but the use of the invention is not to be limited to such employment as its utilization in many fields of endeavor will be apparent to those skilled in the various lines of work and recreation requiring the use of measurements. The use of the word "pin" herein designates, particularly, the stick or staff of a flag but is to be considered as any appropriate target of known height or having perpendicular distances represented thereon above a base line, such as a ground surface, and the term "target" is to include any vertical, horizontal or angular means that can be sighted.

In view of our present development of the invention an object thereof is to provide a measurement indicating means for various types of optical instruments whereby not only a distance measurement to an object of known height can be ascertained but the height of such object can be calculated or shown on a scale of proper calibration when the width of such object and the distance therefrom is known or by the use of a test target of known height at a known distance from the person taking the observation.

A very special object of this invention is to provide a longitudinally movable slide including a reticle comprised of a pair of diverging sighting lines consisting of hairs, threads, wires, the edges of openings, strips, bars and etched and scribed lines and the like, said sighting lines being in constant fixed relation to each other and of straight or slightly irregular formation lengthwise thereof.

Another object of our invention is to provide, in a device of the character mentioned, what we term a fixed or plumb or alignment line, in the form of a fine pin, wire, hair, thread, etched or scribed lines in juxtaposition but not a part of and in combination with a reticle consisting of diverging sighting lines one of which is the base line and may be at right angles to said plumb line with the other sighting line oblique to the alignment line, said sighting lines being fixed relative to each other and included as a part of an adjustable slide having a plurality of differently calibrated scales thereon for cooperation with an index line conveniently comprised of an edge of a housing for the slide.

The scales also can be on the slide housing to be read from an index line on an edge of the slide in cooperative visible relation to the scale markings as, for example, through openings or windows in the slide housing.

Another object of the invention is to produce a measurement indicating means comprising any appropriate type of optical instrument provided with a slide housing to receive and hold at one time any one of a plurality of slidably adjustable different interchangeable reticles with associated specifically calibrated scales or the same or similar reticles and associated differently calibrated scales for various specific uses.

A further object of the present invention is to provide, in combination, an adjustable optical instrument or telescope of the erecting or inverting type, a slide housing thereon in which is movably mounted an adjustable slide carrying a reticle comprised of diverging sighting lines and said slide having an exposed face with scales thereon composed of indication marks for cooperation with an index edge of said housing, a fixed plumb or alignment line in juxtaposed relation to the reticle and perpendicular to the movement of the slide, the housing or possibly to one of the sighting lines.

A still further object of our invention is to provide means for adjusting the slide or sliding reticle comprising a finger-piece or some equivalent thereof, such as a micrometer screw mechanism.

With the above and other objects in view this invention consists of the details of construction and combination of elements hereinafter set forth and then designated by the claims.

In order that those skilled in the art to which this invention appertains may understand how to make and use the same we will describe its construction in detail referring by numerals to the accompanying drawing forming a part hereof, in which:

Fig. 1 is a longitudinal sectional view, with some portions in elevation, of apparatus embodying our invention taken on the longitudinal median line of Fig. 2.

Fig. 2 is an inner end view of the apparatus looking at the eye-piece.

Fig. 3 is an elevational view of the stop ring and plumb line support showing a convenient means for mounting said plumb line.

Fig. 4 is a fragmentary face view of the slide illustrating one way of producing the reticle.

Fig. 5 is a similar view of a modified form of reticle.

Fig. 6 is also a similar view of a further modification.

Fig. 7 is an enlarged sectional view on the line 7—7 of Fig. 5.

Fig. 8 is an enlarged section on the line 8—8 of Fig. 6.

Fig. 9 is an enlarged fragmentary view of the apparatus looking into the eye-piece and illustrating a possible view of an object prior to lining up the elements for making a measurement.

In carrying out our invention as herein embodied 10 represents the tubular body or case of any conventional telescope or optical instrument in one end of which is adjustably mounted the objective 11, including the usual objective lens 12, while in the other or inner end is adjustably mounted the eye-piece 13 including the usual eye-piece set of lenses 14.

For purposes of illustration we have shown a rectangular slide housing 15 including a front wall 16 and a rear wall 17 preferably terminating short of one end of said front wall to provide an index edge or line 18. The front wall 16 may have a hole 19, Fig. 1, for the reception of the main portion 10a of the tubular body of the telescope which is suitably fixedly secured in place while the rear wall 17 may be provided with a tubular body extension 10b in axial alignment with hole 9 and having an inside diameter the same as that of the main portion 10a of the telescope body 10. It is in the extension 10b that the eye-piece 13 is adjustably mounted.

In the inner end of the extension 10b is fixedly mounted a stop to limit the inward movement of the eye-piece 13 and also to act as a support for the plumb or alignment line 21 across a diameter of the sight opening of the telescope or optical measuring instrument. The diameter referred to is the vertical one when the slide housing is in a horizontal position.

The slide housing 15 has a slide 22 adjustably and slidably mounted therein with an end exposed beyond the index edge 18 of the rear wall 17 and said exposed end may be provided with a finger hold 23 for easy manipulation of said slide although mechanical means, such as a micrometer screw can be utilized.

The inner end of the slide 22 is provided with a reticle, formed as an integral part thereof, partly formed therewith or attached thereto. Regardless of the actual construction of the reticle it is movable with and by the slide and in the practice of the invention the slides with the different types of reticles are interchangeably mounted in the slide housing. Also slides having the same types of reticles but of different angular sighting lines and different associated scales are interchangeable for use in connection with targets of different heights, widths, breadths and distances from the viewing location.

As shown in Figs. 1, 2 and 4, in particular, the reticle 24 consists of two sighting lines 25 and 26 disposed across an opening 27 in the slide itself or a fixture connected with said slide. These sighting lines comprise very fine hairs, threads, wires, etched and scribed lines or their equivalents and are arranged in divergent relation to each other. The sighting line 25 is to be considered as the base sighting line and is sometimes positioned at right angles or perpendicular to the plumb or alignment line 21 while the sighting line 26 is oblique to said base sighting line 25 regardless of the position of the latter to said plumb or alignment line 21.

In the modified form of reticle 24a, Figs. 5 and 7, a triangular aperture 28 is formed through the slide, or a fixture connected thereto, to provide a frame having internal divergent edges constituting the base sighting line edge 29 and the other sighting line edge 30 is at appropriate angle to said base sighting line edge 29. These edges which function as the sighting lines are beveled, as shown in Fig. 7, to provide sharpened or knife edges to eliminate the possibility of imparting or causing the formation of phantom sighting lines.

The reticle 24b, Figs. 6 and 8, is formed by inserting two sighting line bars or strips 31 and 32 in an aperture 33 in the slide 22 or a fixture connected therewith. The opposed edges of said bars are beveled or sharpened, Fig. 8, to form the sighting lines and the inner edge of the bar or strip 31 is the base sighting line while the inner edge of the bar or strip 32 constitutes the angular sighting line which is oblique to the base sighting line. While the sighting line edge of the sighting bar or strip 32 is generally angular or oblique it may have stepped configuration to provide a plurality of straight offsets 34 parallel to but at different distances from the base sighting line.

Scales 35, 36 and 37, Fig. 2, are each comprised of a plurality of indicating marks designating distances to targets, pins or flag sticks of different known heights of, for example, seven feet six inches, five feet eleven inches and four feet five inches, respectively, and other similar scales are provided for indicating intervals between and widths of objects. Thus when sighting at a target of considerable height the upper scales 35 is employed, while with a target of medium height the center or intermediate scale 36 is used, and the reading is taken on the lower scale 37 when sighting a short target.

To ascertain the distance to a target, the height of which is known, such as a flag staff sticking above the ground, said target is sighted through the instrument until an image of the target 38, Fig. 9, is secured in any position or location in the instrument such as that suggested in Fig. 9. Thereafter, the instrument is adjusted to the azimuth until the upright or stick of the target substantially aligns with the plumb line 21. Next the slide 22 is adjusted until the base sighting line 25 coincides with the lower visible part or ground line of the target and the angular or oblique sighting line intercepts the top of the target. This positions certain locations on all of the scales relative to the index line or edge 18 of the slide housing and by reading the scale corresponding to the known height of the target the distance is designated on that particular scale. The scales are calibrated or computed by the well known mathematical formula and the markings may represent intervals of ten yards or other suitable measurements.

Likewise the height of an object, such as a tall flag or other pole, stack or the like, can be obtained by the use of the present device at a known distance from the object. Also the height of an object can be ascertained by first taking a sighting of a test target of known height from a known distance to obtain an initial reading on the proper scale with the reticle set for the known measurements and subsequently resetting the reticle for the height of said object which will then give the proper height on the respective selected scale.

In actual practice we have found that when the alignment line is brought into accurate alignment with the object being sighted and the reticle adjusted to bring the sighted lines into intercepting relation to the two extremes of the target the upper and lower portions of said alignment line are very bright while the intermediate portion becomes rather indistinct due, probably, to the blending thereof into the image of the sighted object.

Of course we do not wish to be limited to the exact details of construction herein shown and described as these may be varied within the scope of the appended claims without departing from the spirit of our invention.

Having described our invention what we claim as new and useful is:

1. In an instrument for determining the distance to an object of known height, the combination comprising a housing, an eyepiece in said housing having a focal plane forwardly disposed with respect to said eyepiece, a slide housing intersecting said first housing and having a slide receiving chamber with a portion disposed at said focal plane, said chamber portion having a vertical alignment line therein, said slide housing having an index portion spaced from said vertical alignment line, and a slide member movable in said slide housing in said focal plane, said slide member having a base line portion and a diverging sighting line portion at a fixed angular relation and with a viewing opening therebetween for movement across said alignment line, and said member having calibrated distance scale markings thereon for alignment with said index portion.

2. In an instrument for determining the distance to an object of known height, the combination comprising a housing, an eyepiece in said housing having a focal plane forwardly disposed with respect to said eyepiece, a slide housing intersecting said first housing and having a slide receiving chamber with a portion disposed at said focal plane, said chamber portion having a vertical alignment line therein, said slide housing having an exteriorly disposed index portion spaced from and parallel to said vertical alignment line, and a slide member movable in said slide housing in said focal plane, said slide member having a base line portion and a diverging sighting line portion at a fixed angular relation and with a viewing opening therebetween, for movement of said base line portion normal to said alignment line, and said slide member having calibrated distance scale markings thereon for alignment with said index portion.

(References on following page)

References Cited in the file of this patent

UNITED STATES PATENTS

| | | |
|---|---|---|
| 277,922 | Ord et al. | May 22, 1883 |
| 444,406 | Andrews et al. | Jan. 6, 1891 |
| 1,087,747 | Evans | Feb. 17, 1914 |
| 1,127,230 | Grauheding | Feb. 2, 1915 |

FOREIGN PATENTS

| | | |
|---|---|---|
| 15,019 | Sweden | Nov. 22, 1902 |
| 28,194 | Great Britain | Dec. 14, 1911 |
| 8,896 | Great Britain | June 16, 1915 |
| 339,150 | Great Britain | Dec. 4, 1930 |